United States Patent
Katsumata et al.

(10) Patent No.: US 7,620,757 B2
(45) Date of Patent: Nov. 17, 2009

(54) CONTENTS TRANSFER SYSTEM AND TERMINAL

(75) Inventors: Kenji Katsumata, Yokohama (JP); Koichiro Nakamura, Hiratsuka (JP); Naoki Otomo, Nagoya (JP); Hitoshi Suzuki, Ebina (JP); Masanori Yoshino, Chiba (JP); Yoshihiro Hayashi, Sagamihara (JP); Kenichi Katsumata, Rye, NY (US)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 11/367,298

(22) Filed: Mar. 6, 2006

(65) Prior Publication Data

US 2006/0224765 A1 Oct. 5, 2006

(30) Foreign Application Priority Data

Mar. 18, 2005 (JP) ............................. 2005-078370

(51) Int. Cl.
*G06F 13/12* (2006.01)
(52) U.S. Cl. ............................ 710/68; 710/5; 709/217
(58) Field of Classification Search ....................... None
See application file for complete search history.

(56) References Cited

U.S. PATENT DOCUMENTS

| | | | | |
|---|---|---|---|---|
| 2001/0029583 | A1* | 10/2001 | Palatov et al. | 713/193 |
| 2002/0046404 | A1* | 4/2002 | Mizutani | 725/58 |
| 2002/0078241 | A1* | 6/2002 | Vidal et al. | 709/247 |
| 2002/0129262 | A1* | 9/2002 | Kutaragi et al. | 713/193 |
| 2003/0078986 | A1* | 4/2003 | Ayres et al. | 709/217 |
| 2004/0059934 | A1* | 3/2004 | Kohiyama et al. | 713/200 |
| 2004/0243814 | A1* | 12/2004 | Nakano et al. | 713/189 |
| 2005/0041809 | A1* | 2/2005 | Fischer et al. | 380/255 |
| 2005/0097596 | A1* | 5/2005 | Pedlow, Jr. | 725/31 |
| 2005/0204019 | A1* | 9/2005 | Flynn et al. | 709/219 |
| 2005/0240958 | A1* | 10/2005 | Nguyen et al. | 725/20 |
| 2007/0033419 | A1* | 2/2007 | Kocher et al. | 713/193 |

FOREIGN PATENT DOCUMENTS

| | | |
|---|---|---|
| JP | 2002-032685 | 1/2002 |
| JP | 2002-259224 | 9/2002 |
| JP | 2003-143049 | 5/2003 |
| JP | 2003-317386 | 11/2003 |

OTHER PUBLICATIONS

Sanuki et al., Design of a Video-Server Complex for Interactive Television, Mar. 31, 1998, IBMRD v42 n2 Mar. 1998, pp. 199-218.*
Anonymous, Method for Provding End-to-End Consumer Multimedia Content Protection Over the Internet to the Home, Nov. 8, 2001, IP.com, pp. 1-4.*

* cited by examiner

*Primary Examiner*—Eron J Sorrell
(74) *Attorney, Agent, or Firm*—Antonelli, Terry, Stout & Kraus, LLP.

(57) ABSTRACT

A contents transfer system which includes a transmitter for transmitting a compressed contents via a network, and a terminal for inputting the contents transmitted from the transmitter via the network and outputting the input contents to a recording/reproducing media according to user's specification. A user can acquire the contents within the recording/reproducing media.

14 Claims, 6 Drawing Sheets

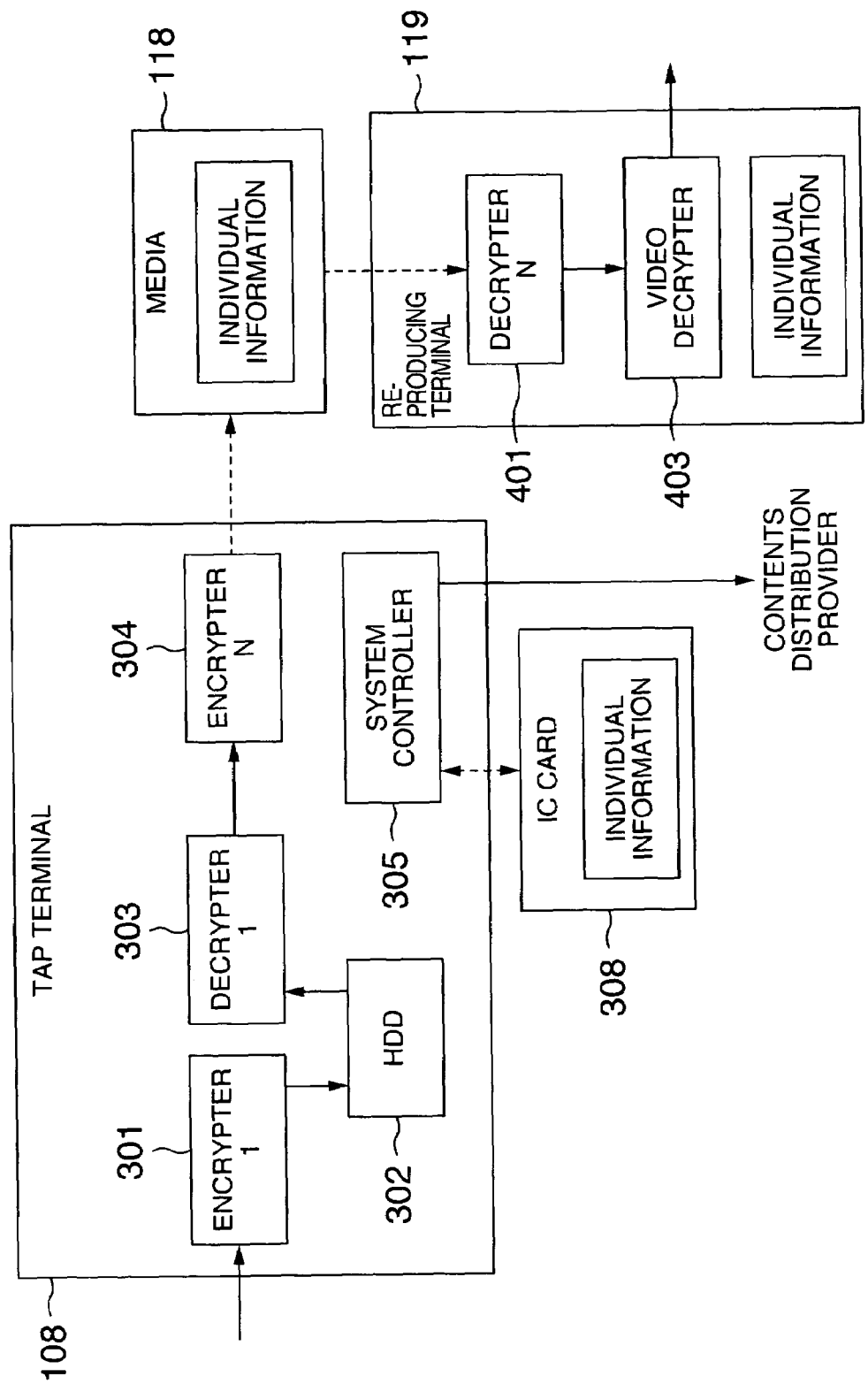

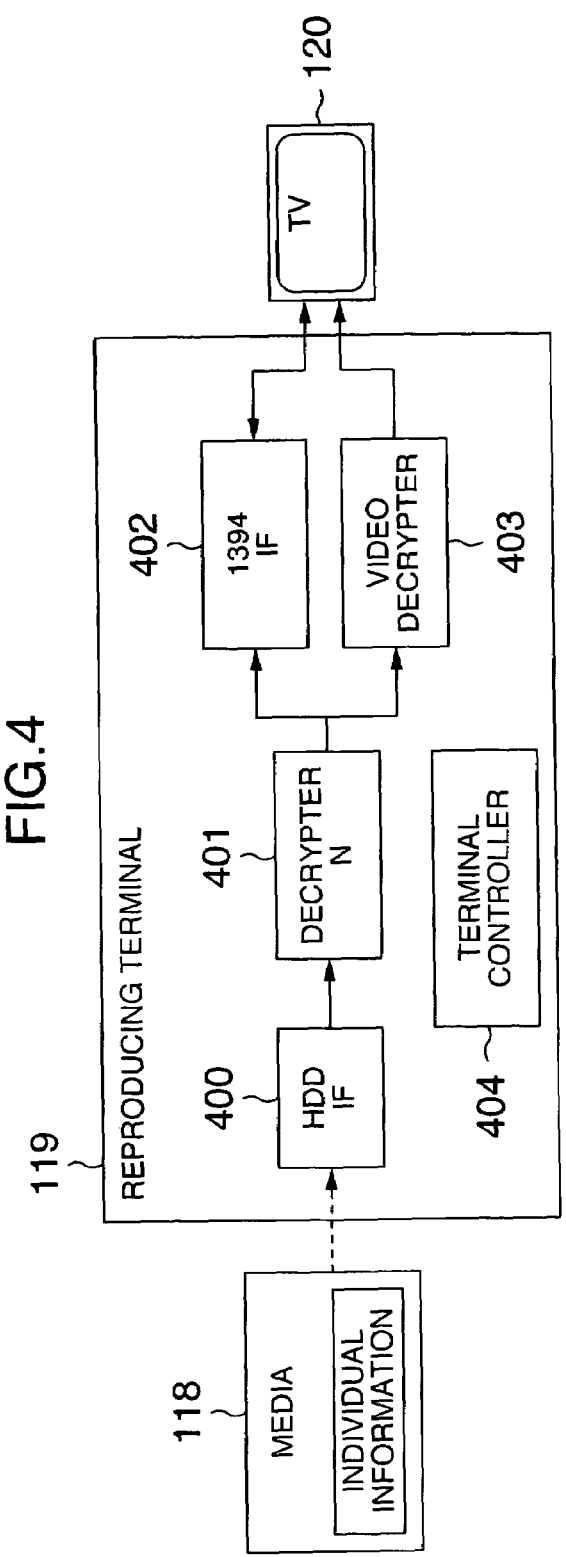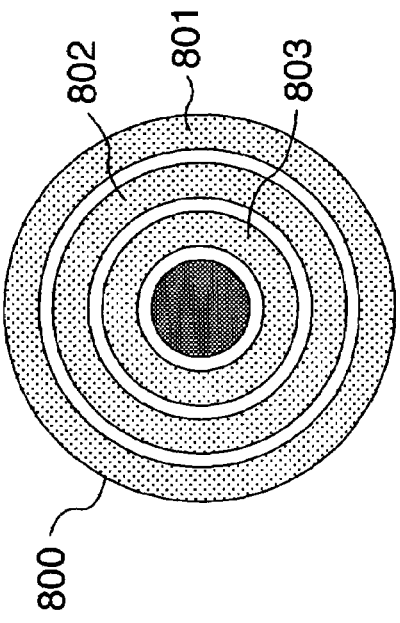

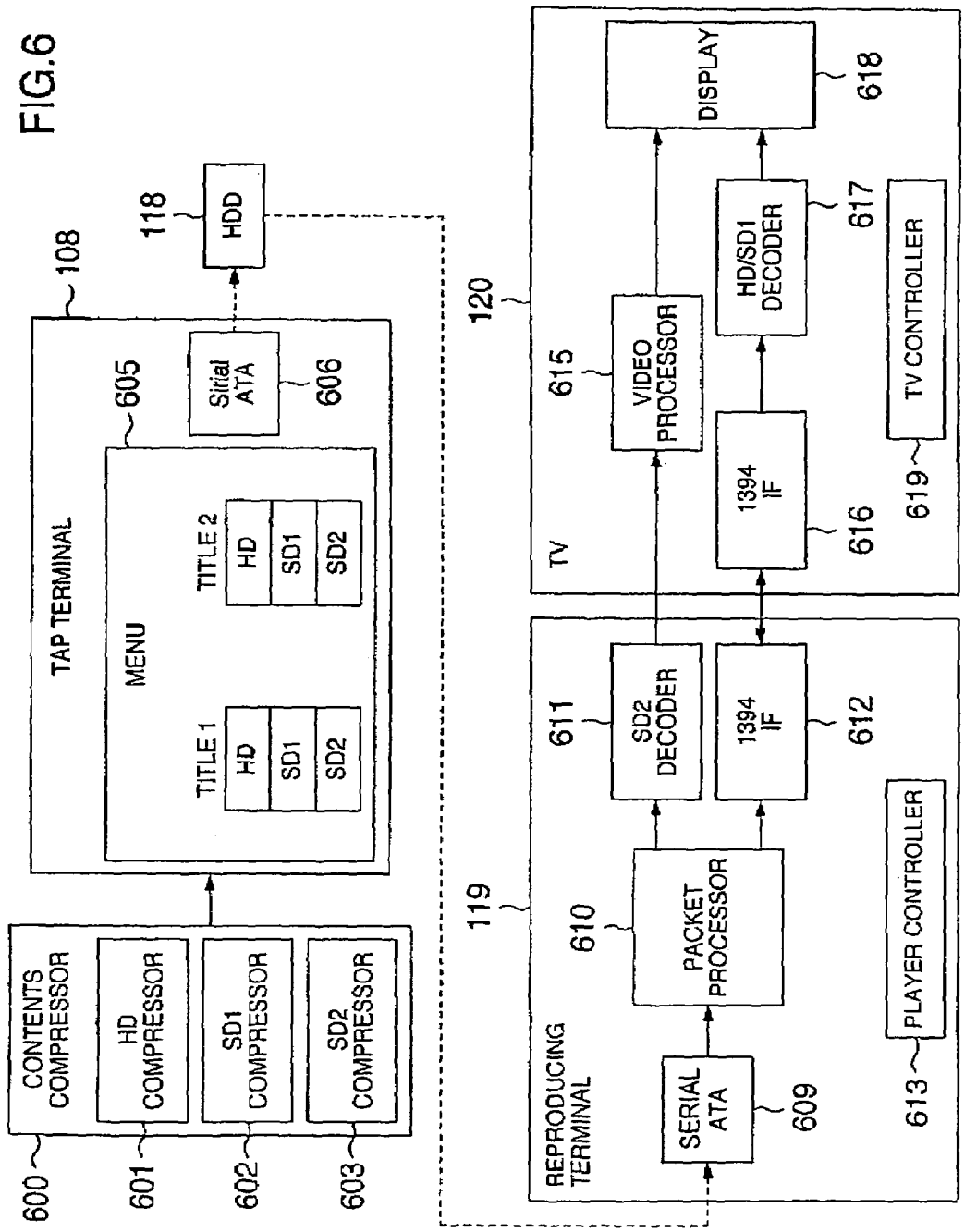

CONTENTS TRANSFER SYSTEM AND TERMINAL

INCORPORATION BY REFERENCE

The present application claims priority from Japanese application JP2005-078370 filed on Mar. 18, 2005, the content of which is hereby incorporated by reference into this application.

BACKGROUND OF THE INVENTION

The present invention relates to a contents rental system which rents a contents such as a movie to a customer and more particularly, to a system which can remarkably improve customer's convenience or handleability with use of a large-capacity, removable storage medium accessible at a high speed.

As a video tape recorder (VTR) spreads, many users get a lot of pleasure out of the VTR by renting movie contents in the form of a cassette for the VTR. Further, as the price of a digital versatile disc (DVD) drops in these years, the tendency of the VTR medium is changing predominantly from the cassette tape medium to the DVD.

Such rental shops employ a system in which VTR tape cassettes or DVD discs are stored in the shops and users select the cassettes or discs. However, this system has several problems that a lot of cassettes or discs having movie titles must be stocked and be managed in the inventory on the shop side, whereas, the number of movie titles is insufficient when viewed from the users side.

In order to solve these problems, there is disclosed a proposal to download contents from a server having contents of movie titles recorded therein to a hard disc drive (HDD) owned by a user, which system has been largely increased in capacity in these years, for example, in JP-A-2002-32685.

SUMMARY OF THE INVENTION

However, problems still exist in the above prior art from the viewpoints which follow. First one of the problems lies in that the major purpose of employing the above rental HDD scheme is users' convenience and availability, whereas, the number of current rental shops is very small and thus such shops cannot acquire sufficient users in business. Thus, when the shop cannot acquire a sufficient number of users, for example, there occurs a danger that the shop may not be able to reclaim an expensive rental HDD or a player necessary for contents rental.

Second one of the problems lies in that no consideration is paid to the fact that it takes a considerable time for the user to download contents from shop's server. Though the HDD access rate is largely increased, in order to download a long time of and a large amount of contents data such as a high definition movie, it takes a considerable time. And when consideration is paid to the fact that a user usually rents contents having a plurality of titles, it is required to shorten the download time. A long download time causes server's availability to drop, which results in that the number of available users is limited and the shop cannot acquire a sufficient number of users. A long download time also causes the user to suffer from undesired stress, with the result that the user will hardly want to again access the shop from the next time on.

In view of the above circumstances, it is an object of the present invention to provide a contents transfer system and a terminal which can secure a sufficient number of users in business and can shorten a write (download) time to a portable recording media.

In accordance with the present invention, the above object is attained by providing a contents transfer system which includes a transmitter for transmitting a compressed contents via a network, and a terminal for inputting the contents transmitted from the transmitter via the network and outputting the input contents to a recording/reproducing media according to user's specification. In this case, a user can acquire the contents within the recording/reproducing media.

In the present invention, there can be provided a contents transfer system and a terminal which can secure a sufficient number of users in business, and can shorten a write (download) time to a portable recording media.

These and other features, objects and advantages of the present invention will become more apparent from the following description when taken in conjunction with the accompanying drawings.

BRIEF DESCRIPTION OF THE DRAWINGS

FIG. 3 shows a relation between a TAP terminal and a reproducing terminal in the first embodiment;

FIG. 4 is a block diagram of the reproducing terminal in the first embodiment;

FIG. 5 is a diagram for explaining the concept of how to record a contents to a recording media in a third embodiment;

FIG. 6 shows how a contents is compressed in the first embodiment; and

DESCRIPTION OF THE EMBODIMENTS

Figure 1:
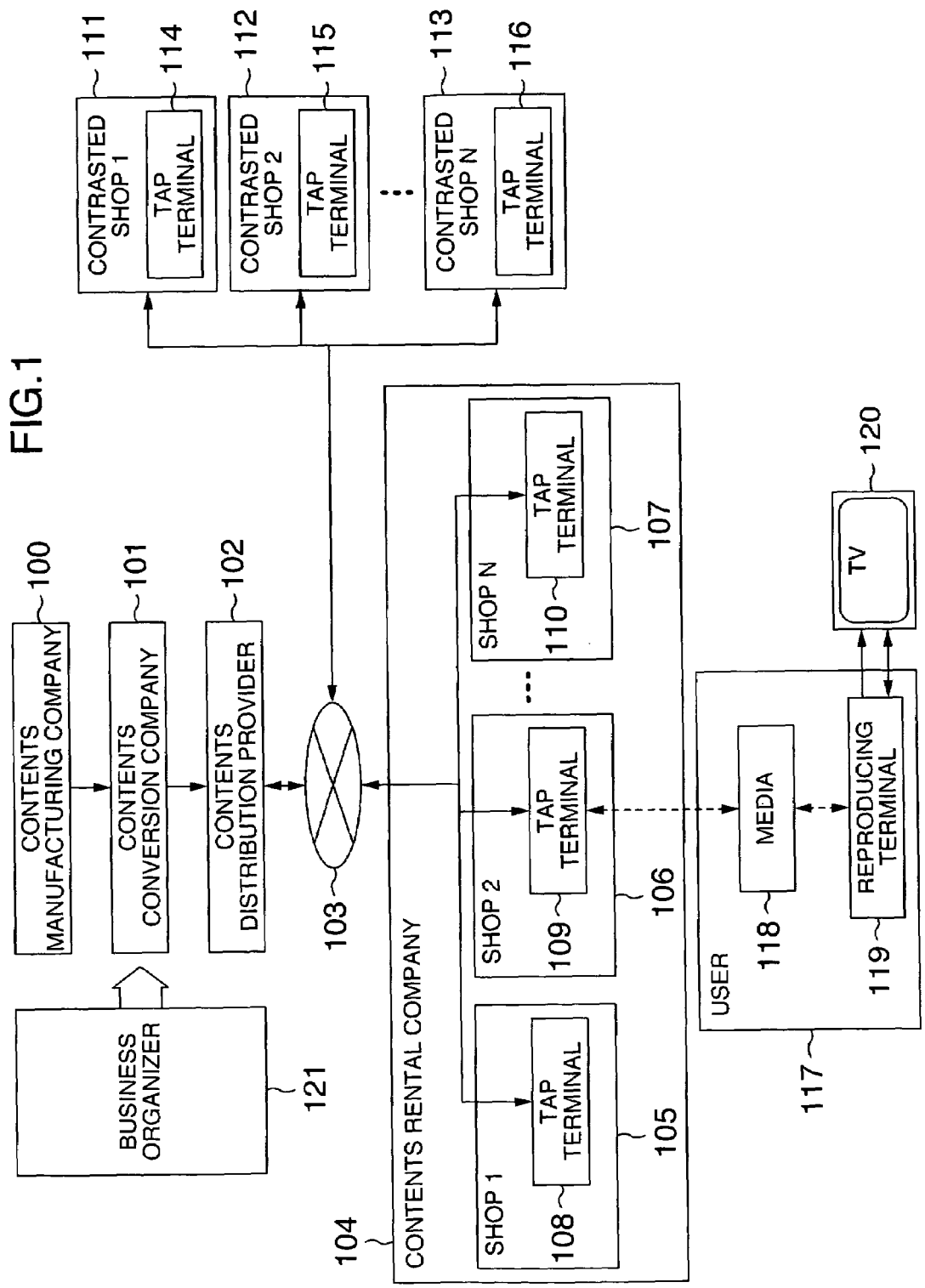
FIG. 1 is a block diagram of a contents rental system in accordance with a first embodiment.

Embodiments of the present invention will be explained with reference to the accompanying drawings. In the drawings, elements having the same functions are denoted by the same reference numerals and double explanation of elements once explained will be omitted. In the drawings, a dotted line denotes a connection of a portable removable media.

Embodiment 1

FIG. 1 is a block diagram of an arrangement of a contents rental system in accordance with a first embodiment. In FIG. 1, reference numeral 100 denotes a contents manufacturing company; numeral 101 denotes a contents conversion company which converts contents provided from the contents manufacturing company 100 into digital contents and compresses the digital contents; 102 denotes a contents distribution provider which manages and distributes the contents compressed by the contents conversion company 101; 103 a network; 104 a contents rental company which specializes in renting contents to users; 105, 106, 107 shops owned by the contents rental company or belonging thereto respectively; 108, 109, 110 TAP (Town Access Point) terminals (meaning terminals accessible in town) installed within the shops 105, 106, 107 respectively. Reference numerals 111, 112, 113 denote shops which also runs the contents rental business while running another business different from the contents rental company (which shop(s) will be referred to as 'contrasted shop(s)', hereinafter); numerals 114, 115, 116 denote TAP terminals installed within the contrasted shops respectively; 117 denotes a contents user; 118 a portable removable recording/reproducing media (which will be referred merely to 'recording/reproducing media', hereinafter); 119 a reproducing terminal for reproducing movie contents or the like from the recording/reproducing media 118; 120 a television set for outputting video and audio from the reproducing terminal. In this connection, the contrasted shops 111, 112, 113 include, for example, a store (so-called a convenience store) joining in a franchise system based on many-store development project, a post office, a bank, a consumer credit company, etc. located in various regions of Japan. In this example, for convenience of explanation, the television set 120 is assumed to have a function of receiving a digital television broadcast program based on BS, CS, terrestrial signal. However, the present invention is not limited to the specific example.

In the present embodiment, the contents of movie, etc. provided from the contents manufacturing company 100 have various types of formats. However, the contents conversion company 101 converts these contents according to MPEG 2 or the like as a typical video/audio compression algorithm. For the compression algorithm, a plurality of algorithms are prepared, and compression using at least MPEG2 is required to prepare a compressed contents. The reason is, due to digital broadcast spread, to commonly use the MPEG2-compressed contents for decoders (devices for decoding or decompressing the compressed digital contents) which already exist in many homes. However, the use of MPEG2 is not always required depending on the system.

Meanwhile, a business organizer 121 intended to cause various types of digital compressed contents to be downloaded from the contents distribution provider 102 via the network 103 to the TAP terminals 108, 109, 110 installed in the shops 105, 106, 107 belonging to the contents rental company 104. Similarly, the digital compressed contents are stored from the contents distribution provider 102 even into the TAP terminals 114, 115, 116 within the contrasted shops 111, 112, 113.

It is desirable that the distribution to the TAP terminal be via the network 103. From the safety viewpoint, however, the offline distribution to the TAP terminal not via any network may be possible by mailing a media containing the contents.

The contents stored, for example, in the TAP terminal 108 located in one shop (e.g., 105) run by the contents rental company 104 mainly include new VTR or DVD works tending to be out of stock upon usual rental, titles of the new works, and special titles which are usually not stored in the shop. The contents to be stored are determined by instruction of the business organizer 121 or the contents distribution provider 102. The stored contents are not always the same as in all the TAP terminals, and may be different among the TAP terminals depending on the shop installation location. The contents may also be determined according to the analysis of rental information about the respective TAP terminals.

The contents user 117 (referred to merely as 'user', hereinafter) carries the recording/reproducing media 118 rented or purchased from the business organizer 121, copies desired contents from the TAP terminal 108 of the nearest shop to the recording/reproducing media 118, connects the reproducing terminal 119 rented or purchased similarly from the business organizer 121 with the television set 120 installed in home, and enjoys herself or himself in viewing, watching or listening to the contents.

Explanation will now be made as to a means for preventing the contents from being illegally copied, by referring to FIG. 3. It is assumed in the following description that the TAP terminal 108 within the shop 105 is treated as a representative TAP terminal.

In FIG. 3, reference numeral 301 denotes an encrypter for each contents; numeral 302 denotes a large capacity storage media (referred to as the HDD, hereinafter) such as a hard disc for storage of the contents in the TAP terminal 108; 303 denotes a decrypter for decoding the encrypted contents read out from the HDD 302; 304 an encrypter for encrypting contents with a key different from the encrypter 301; 305 a system controller for controlling the TAP terminal 108; 401 a decrypter associated with the encrypter 304; 403 a video decrypter for decoding a compressed video; 308 an IC card. Other elements are the same as in those in FIG. 1.

The digital compressed contents is stored in the HDD 302 within the TAP terminal 108. However, for the sake of security, the digital contents is once encrypted by the encrypter 301 and then stored in the HDD 302. The encryption system or its encryption key is inherent in the TAP terminal, and its algorithm is also externally secret. As another method, it is considered that the contents distribution provider 102 applies encryption to the TAP terminal 108. In this case, the encrypter 301 becomes unnecessary. Further, the contents conversion company 101 may apply encryption. That is, any method can be employed basically so long as the security of contents in the TAP terminal 108 can be secured. When the user downloads a desired contents to the recording/reproducing media 118, the TAP terminal 108 confirms the correctness or authentication of the recording/reproducing media 118 on the basis of individual information (previously written by the business organizer 121 and usually encrypted) written in the recording/reproducing media 118, encrypts the downloaded contents by a the encrypter 304 with use of a key conforming to the individual information, and then writes the encrypted contents in the recording/reproducing media 118. As another system, there is a method for encrypting contents with use of the individual information within the IC card 308 owned by the user. A method for encrypting contents with use of both of the individual information within the recording/reproducing media 118 and within the IC card 308, or a method for inquiring of a distribution center, is also considered. In these methods, the TAP terminal confirms the authenticated user or the authentication of the recording/reproducing media, encrypts the contents at the encrypter 304, and then transmits the encrypted contents to the recording/reproducing media 118.

The user reproduces the contents from the recording/reproducing media 118 having the contents written therein by using the reproducing terminal 119 installed in home. At this time, the reproducing terminal 119 pairs off with the recording/reproducing media 118, the reproducing terminal 119 has the decrypter 401 associated with the encrypter 304, and the decrypter 401 decrypts the contents with use of a key conforming to the individual information stored in the reproducing terminal 119. The decrypted contents is converted by the video decrypter 403 based on the algorithm of the contents compression to a video signal, and then output to the television set 120. The pairing of the recording/reproducing media 118 and the reproducing terminal 119 can be realized by the business organizer 121 which previously writes the individual information in the recording/reproducing media 118 when the recording/reproducing media is rented to or sold to the user. In this way, a measure to prevent illegal use of the contents is taken to increase the system security.

Figure 2:
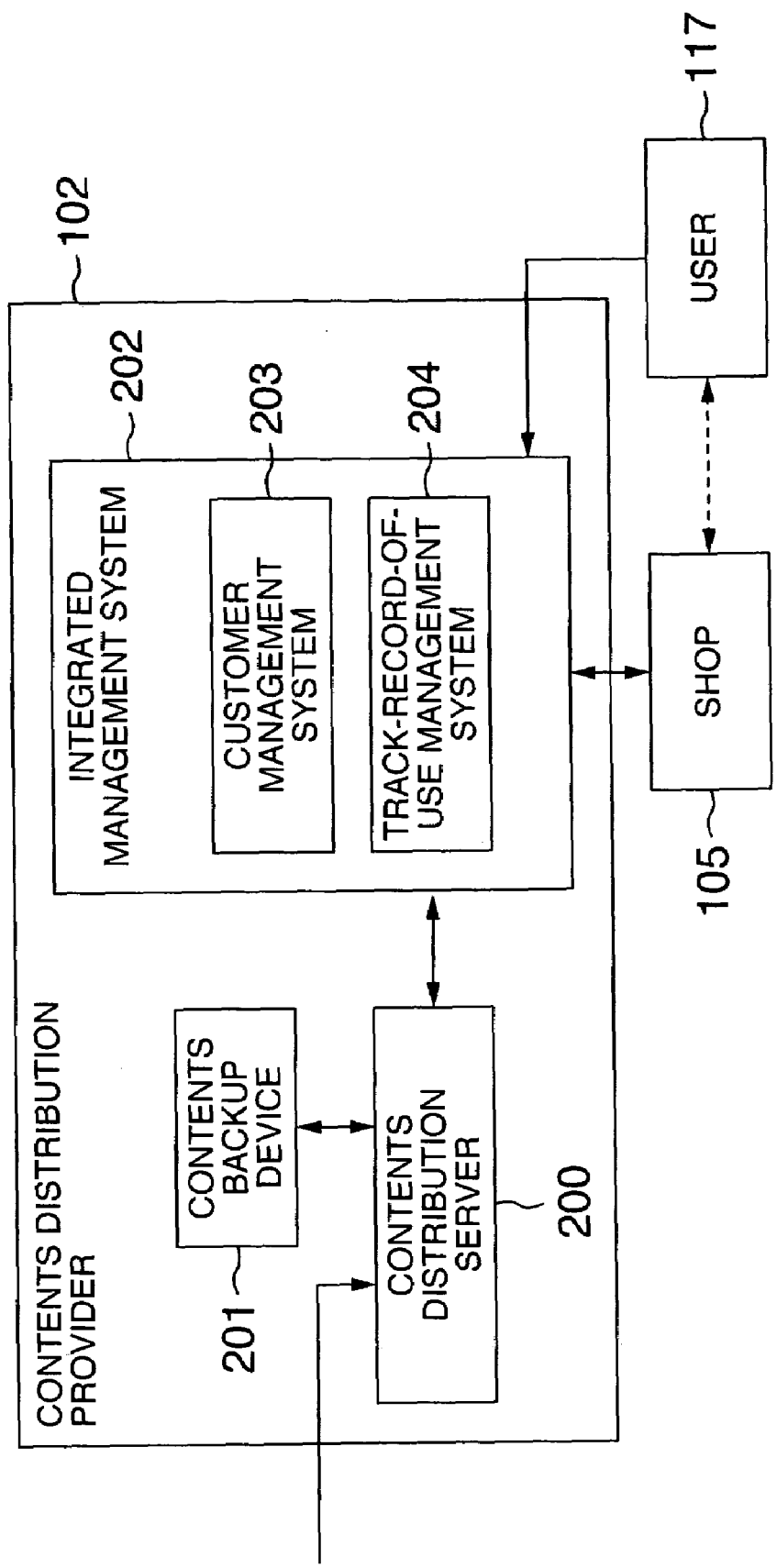
FIG. 2 is an arrangement of a contents distribution provider in the first embodiment.

FIG. 2 shows an example of a system arrangement of the contents distribution provider 102. In FIG. 2, reference numeral 200 denotes a contents distribution server, numeral 201 denotes a contents backup device, 202 denotes an integrated management system, 203 a customer management system, 204 a track-record-of-use management system. Other elements are the same as in those in FIG. 1.

The contents distribution server 200 has a function of storing digital contents therein and as necessary, downloading necessary contents of the stored contents to the TAP terminals of the shops via a means such as a network. The integrated management system 202 has the customer management system 203, the track-record-of-use management system 204, and so on. The integrated management system 202 collects a track record of use from each shop (e.g., the shop 105) and takes the statistics of billing management or of a track record of use. The track record of use can be collected on the basis of an access record having users accessed to or downloaded from the TAP terminal 108. The track-record-of-use management system 204 also can accept a request or the like from the user and can distribute a specific contents to a specific shop according to the request. In the present embodiment, in this way, the contents stored in the TAP terminal 108 or the like can be freely set according to the information collected from the TAP terminal 108 or the like installed in each shop so as to meet customer's demand.

Explanation will now be made as to an example of a billing or charging system to a customer. In the present embodiment, on the basis of information (the recording/reproducing media 118 being capable of having, in addition to contents, an access record indicative of whether or not the contents was reproduced, information for controlling the contents, information about contents so far rented by the user (rental information), a questionnaire file, etc.), limitation of viewing date can be applied to the contents. Thus, it is basically unnecessary for the user to return the downloaded contents to the shop. Accordingly, a method for billing when a desired contents is downloaded (which will be referred to as 'first billing', hereinafter) is generally considered. However, this billing method undesirably charges the user even when the user did not view the contents. To avoid this, another method is also considered for judging the already-viewed, previously-downloaded contents in the recording/reproducing media 118 on the basis of the access record information to the contents in the recording/reproducing media 118 when the user downloads desired contents next time, and for charging the user for it (which will be referred to as 'second billing', hereinafter). In other words, there is considered such a method as to make free the first billing when a desired contents is downloaded and to determine the second billing when another desired contents is downloaded next time according to the use history (access record) of the previously-downloaded contents.

Various billing systems can be set which includes discount charge when a contents is downloaded together with sponsor's CM and when a record of the viewed CM is left, application of a discount charge to a responder who downloaded a contents together with a questionnaire file and who responded to the questionnaire (who can electronically respond to the questionnaire by utilizing a digital data broadcast mechanism), and the introduction of a fixed-price system as a monthly contact. Further, discount charge may be applied according to a rental history, for example, according to the number of contents rented by the user.

In this way, the charging system of the present embodiment is of benefit to users and thus it is expected to get repeaters who continually rent contents.

Though it is unrelated to the billing, when the rental history information in the recording/reproducing media 118 is presented to the user, this can also prevent the user from again renting the same contents from user's misunderstanding. A method for charging the user upon the first billing and adjusting the charge upon the second billing according to the access record may also be employed.

FIG. 4 is a detailed block diagram of an embodiment of the reproducing terminal 119 explained in FIG. 3. In FIG. 4, reference numeral 400 denotes an HDD interface circuit, numeral 401 denotes a decrypter, 402 denotes an interface circuit (which will be referred to as the 1394 IF, hereinafter) conforming to IEEE1394 specifications, 403 a video decrypter for decrypting the digital compressed contents, 404 a terminal controller for controlling the reproducing terminal. Other elements are the same as those in FIG. 1.

The HDD interface circuit 400 reads out from the recording/reproducing media 118 according to an instruction from the terminal controller 404, and outputs the read-out contents to the decrypter 401 for the cryption. The decrypter 401 decrypts the received contents with use of a key conforming to the individual information within the reproducing terminal 119, and sends the decrypted contents to the 1394 IF 402 and to the video decrypter 403. When the television set 120 owned by the user has an 1394 IF, the 1394 IF 402 digitally transmits the contents according to an AV transmission protocol of the IEEE1394. When the television set 120 has no analog input terminal, the compressed video is decrypted by the video decrypter 403 to a video signal, which in turn is connected to the television set. In any of the digital transmission and the analog transmission, a copy-guard signal is applied to prevent unauthorized duplication of contents. In particular, in digital transmission on the IEEE1394, authentication is carried out between the television set 120 and the reproducing terminal 119 according to a scheme determined by the specifications to confirm that the television and terminal are authorized devices, a specific encryption is applied to the contents on the transmission line, and then the encrypted contents is transmitted. For this reason, in particular, in the digital transmission on the IEEE1394, such contents has a high security against its unauthorized duplication. As another connection method, HDMI (High Definition Multimedia Interface) connection is considered.

After BS digital broadcasting and digital terrestrial broadcasting start, a television set capable of receiving a digital high definition program is spreading. Thus, when IEEE1394 IF is used and when an MPEG2 decoder mounted in a television unit is used, high definition contents can be used in video rental. Many of television sets compatible with the BS digital broadcast have an IEEE1394 terminal, and many of users who rent movie contents wish to view the contents with a high picture quality and a high quality of sound. Thus, when the present embodiment is employed for such television sets, there can be inexpensively provided a video which has a high picture quality and a high quality of sound and meets users' demands. For this reason, the contents distribution provider 102 explained in FIG. 1 is required to compress high definition contents according to MPEG2-MP@HL based on broadcast specifications. Meanwhile, in order to increase a compression efficiency for contents other than high definition contents; it is only required, when the Player 119 is distributed, previously to employ an efficient compression method and to make the video decrypter 403 of the reproducing terminal 119 compatible with the employed compression method. As a result, a contents distribution time taken from the contents distribution provider 102 to TAP terminals (such as the TAP terminals 108 to 110 and 114 to 116) installed respectively in a plurality of shops (such as the shops 105, 106, 107 and the contrasted shops 113, 112, 112) can be shortened. And a download time required for the user to download contents from the TAP terminal to the recording/reproducing media 118, can also be shortened.

To shorten the download time to the recording/reproducing media is especially an important factor in the contents rental business, from the viewpoint of acquiring many users. As has been explained in the above "Summary of the Invention", when the download time is long, the availability of the TAP terminal is decreased. This results in a limited number of users and in no expectancy of acquiring a number of users sufficient for the business. A long download time also causes the user to suffer from unnecessary stress. For this reason, the probability that the user again tries to download next time becomes very low. According to the present embodiment, however, since the download time can be shortened, an increase in the number of users can be expected.

As has been explained above, in the present embodiment shown in FIG. 1, a service to rent contents of movie, etc. can be provided with a high security, a high picture quality, and a high quality of sound as in high definition contents.

In the embodiment of FIG. 1, further, since contents is distributed to respective access terminals installed in shops via the network, the contents distribution can be made not only to the contents rental company 104 which runs an exclusive contents rental business to users but also to such shops (e.g., convenience stores) belonging to a so-called many-store development system as the contrasted shops 111, 112, 113.

The contents rental company 104 already has storage shelves of media such as VTR or DVD in the current business, and it is difficult such a company to shift from the current business system fully to a rental system of using all removable media. Accordingly, the contents rental company can take such a business form as to specialize in special contents such as new work movies having high rental frequencies and having a low possibility of being stocked as an inventory and to previously store such contents in the TAP terminal 108, etc.

When the contents distribution provider 102 makes contract with stores such as convenient stores belonging to many-store development system, the contents distribution provider can increase the number of contents rental shops to a large extent, though rental shops have been so far restricted to limited places. In the present embodiment, since compressed contents is downloaded from the TAP terminal to a local recording/reproducing media, the download time can be shortened. Thus, the contrasted shop such as a convenient store having an inventory with a less space can be expected to start the contents rental business. Even in this case, when the contrasted shop 111 or the like having a limited shop space places only contents having high rental frequencies as sale goods, users can easily rent contents of new work movie, etc. at stores close to their homes. Thus the user convenience or service can be enhanced, and the coexistence with the existing contents rental company can be realized. Further, when shift from the conventional membership system to a TAP terminal use membership system is made in the existing contents rental company 104, a business model to quickly start this rental business can be established.

In this business model, since a sufficient number of users can be expected in business, a contents rental fee sufficient in business can be expected, and thus a stock dividend to the business organizer, store owner, contents distribution provider, contents conversion company, and contents owner can be expected.

As has been explained above, when the present embodiment is used, the user can always rent a popular contents in a store close to user's home, and the user can enjoy the contents with a high picture quality and a high sound quality which have not been seen before. Further, the store owner can reduce an inventory space in his store, avoid a chance loss when a popular contents becomes out of stock to thereby disable its rental, automate analysis of a contents rental tendency, etc., increase a profit due to an increased number of members caused by service improvement, and reduce a personnel expense caused by tape rewinding work so far required.

By referring to FIG. 6, explanation will next be made as to a mechanism of how a contents is provided in FIG. 1. FIG. 6 is a diagram for explaining a contents compressing mechanism in the present embodiment. In FIG. 6, reference numeral 600 denotes a contents compressor, and numerals 601, 602, 603 denote compressing means included in the contents compressor 600. More specifically, the compressing means 601 is an HD compressor for compressing a contents with a high picture quality, the compressing means 602 is an SD1 compressor for compressing the picture quality with a middle level, and compressing means 603 is an SD2 compressor for reducing its bit rate to a low level. Reference numeral 605 denotes a menu on a display screen displayed on the TAP terminal 108; numeral 606 denotes a high-speed interface; 609 denotes a high-speed interface on the side of the reproducing terminal 119; 610 a packet processor for processing a signal read out from the recording/reproducing media 118; 611 an SD2 decoder associated with the SD2 compressor 603; 612 a 1394 IF conforming to IEEE1394 standard; 613 a reproducing terminal controller for controlling the reproducing terminal 119. The television set 120, which is connected to the reproducing terminal 119, has a function of receiving a digital television broadcast program. In the television set 120, reference numeral 615 denotes an analog base video processor, numeral 616 denotes a 1394 IF conforming to IEEE1394 standard, 617 denotes an HD/SD1 decoder associated with the SD1 compressor 602 and the HD compressor 601, 618 a display unit, 619 a TV controller for controlling the television set 120.

A contents prepared by the contents manufacturing company 100 explained in FIG. 1 is compressed by the contents conversion company 101 in order to reduce the data capacity of the contents. In this example, as shown by the contents compressor 600 in FIG. 6, the compressed contents is associated with the plurality of compression algorithms. In this example, three of the compression algorithms are illustrated as an example. The HD compressor 601 compresses a contents in the scheme of MP@ML (so-called high definition version) based on MPEG2 standard. The SD1 compressor 602 compresses a contents in the scheme of MP@ML (standard-picture-quality version) based on MPEG2 standard. The SD2 compressor compresses a contents by the compression method conforming to a scheme different from the above two schemes. In the Digital Terrestrial Broadcasting Standards in Japan, currently, MPEG2 is employed as a contents compressing method, and detailed parameters for it are defined. High definition compression is based on an interface of 1920× 1080/30i ((horizontal pixel number×vertical line number)/ frame frequency: interlace), and broadcasting is carried out at a bit rate of about 20 Mbps. A standard picture quality of contents is based on an interlace of 720×480/30i. In this case, its bit rate is considered to be about 4 or 6 Mbps. Even in the high definition, 1280×720/60p (p: sequential scanning) can be allowed. In a movie contents, compression of 24 frames is possible. Since the movie contents can be compressed with 1280×720/24p, the compression is possible down to a bit rate corresponding to about half of the aforementioned bit rate according to the Broadcast Standards. Even with respect to a standard picture quality of contents, a movie contents can be compressed with 24 frames and its compression rate can be lowered further from the above 4-6 Mbps.

By devising the compression method in the contents compressor 600, in this way, the capacity or size of contents defined by the current Broadcast Standards can be largely reduced. This has merits that the use efficiency of a disc within the TAP terminal 108 can be increased, a contents transmission time from the TAP terminal 108 to the recording/reproducing media 118 can be largely shortened, and the HD/SD1 decoder 617 existing in the current television set 120 having the digital broadcast program receiving function can be used as it is.

When the SD2 compressor 603 employs a contents compressing algorithm advanced after setting of the Broadcast Standards, the contents can be more efficiently compressed. Well known algorithms include MPEG4 or H.264. However, other various compression algorithms are present. All you can do is to select an algorithm seemingly best when you actually embodies the system of the present embodiment. The employment of a new algorithm enables a contents having a standard resolution to be compressed at a bit rate of 1 or 2 Mbps. In this case, however, the contents cannot be decoded by the television set conforming to the Broadcast Standards, and thus it is required to prepare the aforementioned SD2 decoder 611 in the reproducing terminal 119. When the SD2 compressor 603 is employed, the rate of transmission of the contents to the recording/reproducing media 118 can be further increased.

It is also considered to mount a decoder compatible with the SD2 compressor 603 in the television set 120.

Explanation has been made on the assumption that the SD2 compressor 603 compresses a standard picture quality of contents. This is because, when even a high definition level of contents is reproduced by the SD2 decoder 611 of the reproducing terminal 119, the protection of copyright on the contents cannot be secured between the SD2 decoder 611 and the television set 120. When the compressed contents is transmitted via the 1394 IF 612 and the 1394 IF 616, unauthorized duplication of the contents can be avoided with use of authentication carried out between the devices or with use of an encrypting means. Therefore, even a high definition contents requiring vital copyright protection can be transmitted.

The user selects a contents of a compression scheme compatible with the television set owned by the user from the menu 605 displayed on the TAP terminal 108 to transmit the selected contents to the recording/reproducing media 118. When the user has no display unit compatible with high definition, the user is only required to select a contents compressed using the SD2 compression scheme.

In this way, with such an arrangement as shown in FIG. 6, many merits can be obtained including the high speed transmission of contents (a shortened distribution time, a shortened download time), the usability of the existing television set owned by the user, the cost reduction of the reproducing terminal 119, and the effective use of the disc capacity of the TAP terminal 108. As a result, with such a system configuration as shown in FIG. 1, a contents rental business can be established.

Embodiment 2

Figure 7:
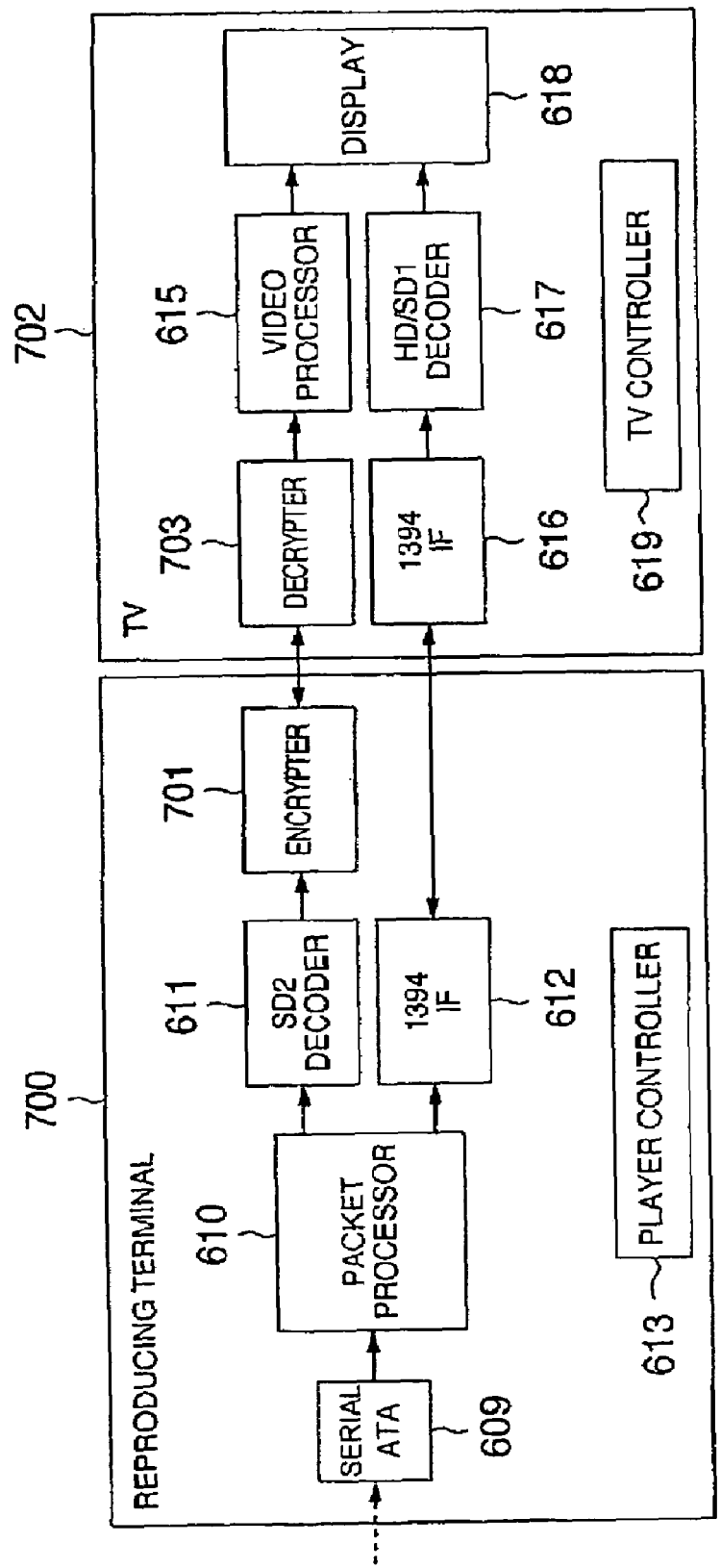
FIG. 7 shows a relation between a reproducing terminal and a display terminal in a second embodiment.

FIG. 7 shows a second embodiment of the reproducing terminal 119. More specifically, FIG. 7 shows a block diagram of the reproducing terminal of the second embodiment and a block diagram of a television set.

In FIG. 7, reference numeral 700 denotes a reproducing terminal, numeral 701 denotes a video encrypter, 702 denotes a television set in the present embodiment, 703 a video decrypter. Other elements are the same as those in the reproducing terminal 119 and the television set 120 shown in FIG. 6. In the present embodiment, the video encrypter 701 is provided in a video output part of the reproducing terminal 700, that is, in an output part of the SD2 decoder 611; and the video decrypter 703 is provided in a video input part of the television set 702, thereby preventing illegal use of a video signal. The security of the contents is realized by mutual authentication between the video encrypter 701 and the video decrypter 703 and exchanging encryption keys. This can be realized, for example, by using the aforementioned HDMI interface which recently started to be employed.

When the configuration of the present embodiment is introduced, by compressing also a high definition level of contents by the SD2 compressor 603 shown in FIG. 6, the contents can be efficiently stored and the transmission time thereof can be shortened.

Embodiment 3

Explanation will be made as to an example of an efficiency control method when a contents is copied from the TAP terminal 108 or the like to the recording/reproducing media 118 possessed by a user, with reference to FIG. 5. FIG. 5 shows a conceptual view of a recording region on the recording/reproducing media 118.

In FIG. 5, reference numeral 800 denotes an HDD platter; and numerals 801, 802, 803 denote continuous recording areas respectively. As has been explained even in the second embodiment in FIG. 7, in a business to record a contents of movies or the like in a removable media and to rent the recorded contents, its major problem is to increase the transmission rate of the contents to the removable media. One of causes involving reduction of a write/read speed to the HDD is a head seek time. Therefore, it is necessary basically to record the contents in continuous sectors. The major use of the HDD in the present invention is basically the writing of a video contents. Thus, when the HDD can store, for example, three contents therein, each contents is controlled to be written in each of the three continuous areas. The HDD may have actually a defective sector or the like unlike FIG. 5, but it is assumed that the same contents is basically written in continuous sectors. When the user writes a contents, the writing of the contents is carried out to the outermost peripheral area. For example, when the user rents a single contents, the contents is recorded in the outermost peripheral area 801. When the user rents two contents, the two contents are written in the outermost peripheral area 801 and in the intermediate area 802 respectively. When the user rents three contents, the contents have no preferential writing areas. Under such control, the user who rents a less number of contents can advantageously shorten a time taken for the contents to be copied to the recording/reproducing media 118.

The above explanation has been made on the assumption that the recording/reproducing media 118 or the storage within the TAP terminal 108 is an HDD. However, the media or the storage is not limited to the specific HDD but can be a semiconductor memory or the like.

In the foregoing embodiments, (1) since the business organizer distributes selected contents via one of various types of networks to access terminals installed in stores, it is only required for each store to install a limited number of access terminals, it is unnecessary to expand the store to install such access terminal(s) therein due to closed access terminals, the contents can be distributed not only to contents rental exclusive stores but also to contrasted shops other than the rental exclusive stores, and a sufficient number of rental stores can be expected.

(2) Since compressed contents is (are) efficiently downloaded to a portable recording media, its download time can be shortened, and the number of users can be increased. Further, since the download time can be shortened, the availability of the access terminal can be increased, even the contrasted shop having a small space margin can expect to start a contents rental business, which results in acquirement of a sufficient number of rental shops.

(3) Since the charging system (billing system) beneficial to users can be provided and shops or stores having a high availability and a high convenience to users can be located, a number of repeat users or repeaters can be acquired.

As a result, a number of users sufficient for the business operation can be secured.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications falling within the ambit of the appended claims.

The invention claimed is:

1. A contents transfer system comprising:
    a transmitter for transmitting compressed contents via a network;
    a company terminal connected to said network for receiving the contents transmitted from said transmitter via the network, and for outputting the contents to a removable recording/reproducing media, said company terminal including:
    a first encrypter for first encrypting the received contents;
    a recording media for recording the first encrypted contents from said first encrypter;
    a first decrypter for first decrypting the first encrypted contents recorded on the recording media; and
    a second encrypter for second encrypting the first decrypted contents from said first decrypter with use of an encryption key associated with first individual information assigned to the removable recording/reproducing media, the second encrypted contents from said second encrypter is outputted to the removable recording/reproducing media and stored thereon; and
    a user terminal capable of at least reproducing contents read from the removable recording/reproducing media, said user terminal including second decrypter for second decrypting the second encrypted contents downloaded in the removable recording/reproducing media, with use of a decryption key corresponding to the encryption key of the second encrypter,
    wherein the decryption key is associated with second individual information assigned to the user terminal, which is paired with the first individual information assigned to the removable recording/reproducing media,
    thereby a user can view the downloaded contents in said removable recording/reproducing media on only the user terminal which is paired with the removable recording/reproducing media.

2. A contents transfer system according to claim 1, wherein the first individual information is pre-written on the removable recording/reproducing media and the second individual information is pre-written on said user terminal.

3. A contents transfer system according to claim 1, wherein user information regarding to reproducing the downloaded contents in the removable recording/reproducing media is written on the removable recording/reproducing media.

4. A contents transfer system according to claim 3, wherein a billing for the downloaded contents in the removable recording/reproducing media is decided based on the access information.

5. A contents transfer system according to claim 3, wherein a first billing for the downloaded contents is free when the contents is downloaded to a removable recording/reproducing media a first time, and a second billing for the downloaded contents is decided based on the access information when the contents is downloaded to the removable recording/reproducing media at a second time.

6. A contents transfer system according to claim 3, wherein the downloaded contents in the removable recording/reproducing media is applied with a viewing date limitation.

7. A company terminal according to claim 3, wherein the downloaded contents from the network in said recording media of company terminal is decided based on the user information written in the removable recording/reproducing media.

8. A company terminal connected a network, comprising:
    a first encrypter for first encrypting compressed contents via the network;
    a recording media for recording the first encrypted contents from said first encrypter onto a recording media;
    a decrypter for decrypting the first encrypted contents reproduced from the recording media; and
    a second encrypter for second encrypting the decrypted contents from said decrypter with use of an encryption key;
    wherein second encrypted contents from said second encrypter is outputted to a removable recording/reproducing media and stored thereon,
    the encryption key is associated with first individual information assigned to the removable recording/reproducing media,
    the first individual information is paired with a second individual information assigned to a user terminal for reproducing the downloaded contents in the removable recording/reproducing media, and
    thereby, the downloaded contents in the removable recording/reproducing media can be reproduced on only said user terminal which is paired the removable recording/reproducing media.

9. A company terminal according to claim 8, wherein user information regarding to reproducing the downloaded contents in the removable recording/reproducing media is written on the removable recording/reproducing media.

10. A company terminal according to claim 9, wherein the downloaded contents from the network in said recording media of company terminal is decided based on the user information written in the removable recording/reproducing media.

11. A company terminal according to claim 8, wherein a billing for the downloaded contents in the removable recording/reproducing media is decided based on the access information.

12. A company terminal according to claim 8, wherein a first billing for the downloaded contents is free when the contents is downloaded to a removable recording/reproducing media a first time, and a second billing for the downloaded contents is decided based on the access information when the contents is downloaded to the removable recording/reproducing media a second time.

13. A company terminal according to claim 8, wherein the downloaded contents in the removable recording/reproducing media is applied with a viewing date limitation.

14. A company terminal connected a network, comprising:
- a recording media for recording compressed and first encrypted contents via the network;
- a decrypter for decrypting the first encrypted contents reproduced from the recording media; and
- an encrypter for second encrypting the decrypted contents from said first decrypter with use of an encryption key;
- wherein the second encrypted contents from said second encrypter is outputted to a removable recording/reproducing media and stored thereon,
- the encryption key is associated with first individual information assigned to the removable recording/reproducing media, and
- the first individual information is paired with a second individual information assigned to a user terminal for reproducing the downloaded contents in the removable recording/reproducing media, and
- thereby, the downloaded contents in the second removable recording/reproducing media can be reproduced on only said user terminal which is paired the removable recording/reproducing media.

\* \* \* \* \*